(12) United States Patent
Draeger et al.

(10) Patent No.: US 7,039,520 B2
(45) Date of Patent: May 2, 2006

(54) METHOD FOR OPERATING A NAVIGATION SYSTEM FOR A VEHICLE AND CORRESPONDING NAVIGATION SYSTEM

(75) Inventors: Gerd Draeger, Braunschweig (DE); Volker Skwarek, Bad Salzdetfurth (DE); Claus Brenner, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 10/363,123

(22) PCT Filed: Mar. 28, 2002

(86) PCT No.: PCT/DE02/01136

§ 371 (c)(1),
(2), (4) Date: Aug. 19, 2003

(87) PCT Pub. No.: WO03/002943

PCT Pub. Date: Jan. 9, 2003

(65) Prior Publication Data

US 2004/0039525 A1   Feb. 26, 2004

(30) Foreign Application Priority Data

Jun. 28, 2001  (DE) .................. 101 31 197

(51) Int. Cl.
*G01C 21/34* (2006.01)
*G08G 1/0968* (2006.01)

(52) U.S. Cl. ............... 701/211; 701/209; 701/210; 340/995.12; 340/995.19

(58) Field of Classification Search ............. 701/211, 701/200, 207, 208, 209, 201; 340/995.1, 340/995.11, 995.12, 995.13, 995.19, 995.2
See application file for complete search history.

(56) References Cited

U.S. PATENT DOCUMENTS 5,982,298 A    11/1999   Lappenbusch et al.

(Continued)

FOREIGN PATENT DOCUMENTS

EP          0 932 132         7/1999

OTHER PUBLICATIONS

N. Alper et al., *Geospatial Metadata Querying and Visualization on the WWW using Java Applets*, IEEE Symposium on Information Visualization '96, Proc. of IEEE (Oct. 1996), ISBN:0-8186-7668-X, pp. 77-84, 128.

(Continued)

*Primary Examiner*—Tan Q. Nguyen
(74) *Attorney, Agent, or Firm*—Kenyon & Kenyon

(57) ABSTRACT

A method for operating a navigation system and a navigation system for a vehicle, in which data regarding geographic positions of the vehicle are ascertained by a positioning system and transmitted to an electronic data processing device having access to a database and a digital road map, on the basis of this data the location of the vehicle on the digital road map is determined and destination guidance instructions are output visually and/or acoustically to the driver of the vehicle, wherein additional information can be stored in the navigation system and can be retrieved as necessary by the driver and/or other passengers in the vehicle and output via the navigation system, this additional information being loaded into the navigation system in the form of program "navlets" which are usable by the driver and/or other passengers in the vehicle.

26 Claims, 2 Drawing Sheets

U.S. PATENT DOCUMENTS

| | | |
|---|---|---|
| 6,185,491 B1 * | 2/2001 | Gray et al. .................... 701/36 |
| 6,233,520 B1 * | 5/2001 | Ito et al. ...................... 701/208 |
| 6,253,122 B1 * | 6/2001 | Razavi et al. ................... 701/1 |
| 6,362,730 B1 * | 3/2002 | Razavi et al. ............... 340/438 |
| 6,377,860 B1 * | 4/2002 | Gray et al. .................... 700/83 |
| 6,505,100 B1 * | 1/2003 | Stuempfle et al. ............. 701/1 |

OTHER PUBLICATIONS

L. Friendly, *The Design of Distributed Hyperlinked Programming Documentation*, Proceedings of the International Workshop on Hypermedia Design (Jun. 1995), ISBN: 3-540-19985-3, pp. 151-162.

K. Gronbaek, *OHS Interoperability—Issues Beyond the Protocol*, Hypertext 98, OHS Workshop 4.0 (Jun. 1998), ISBN: 0-89791-972-6, pp. 20-24.

* cited by examiner

METHOD FOR OPERATING A NAVIGATION SYSTEM FOR A VEHICLE AND CORRESPONDING NAVIGATION SYSTEM

FIELD OF THE INVENTION

The present invention relates to a method for operating a navigation system and a navigation system for a vehicle, in which data regarding the geographic position are ascertained by a positioning system and transmitted to an electronic data processing device with access to a database and a digital road map, and on the basis of those data the location of the vehicle on the digital road map is determined and destination guidance instructions are output visually and/or acoustically to the driver of the vehicle.

BACKGROUND OF THE INVENTION

Conventional navigation systems for vehicles, in particular motor vehicles, and methods for operating such navigation systems, already exist. They serve to determine the present geographic position of the vehicle, to calculate the most favorable route of travel as a function of a definable destination that is to be reached, and give the driver instructions as to the route of travel.

These conventional navigation systems require information that is necessary for determining the present location of the vehicle and calculating the route of travel. This information includes, for example, road layouts, turning conditions, etc. This data is made available in the form of a database. For this purpose the database encompasses, for example, a so-called digital map that contains way points and/or decision points for the possible routes. The database may be maintained in vehicle-installed mass storage by conventional means such as, for example, a CD-ROM.

Also necessary is a positioning system that identifies the present geographic position of the vehicle. The satellite-based Global Positioning System (GPS) may, for example, serve this purpose.

An electronic data processing device processes the position data furnished by the positioning system along with the data stored in the digital road map and determines the present position of the vehicle. Destination guidance information corresponding to the selected destination may then be provided, visually and/or acoustically, to the driver by the electronic data processing device, based on way points and/or decision points on a selected optimum route of travel.

Conventional navigation systems for vehicles are substantially made up of individual components having different functions. At the beginning of a trip, the driver first enters his or her desired destination into the navigation system via an input unit. A route list is then generated by a route calculation module using a database. This list is used by the destination guidance system, in combination with the vehicle position, to generate driving instructions to the driver, which are output in the form of graphical instructions or in natural speech.

The interaction of the individual components is permanently defined in this context. For example, once the route list has been calculated, it is modified only if the driver so wishes or if the destination guidance system detects that the previously calculated route has been departed from.

The type of output is also permanently defined. A user cannot, for example, replace the symbolic images that are normally available with his or her own symbols, or add additional information to them.

It is moreover difficult to incorporate additional functionality into the system. There exist, for example, travel guides on data media, usually on CDs, which can be used instead of the data medium for the otherwise usual digital map, and which contain not only the minimum requisite data but also additional information, for example regarding places of interest. This information can then be retrieved via the navigation device. This information retrieval is accomplished, however, via the interface defined by the navigation device, so that the configuration options for the human-machine interface is limited. Since the otherwise usual digital map is moreover replaced by the travel guide, it must also contain all the data relevant for navigation. The production of such travel guides is thus difficult, and there are only a few suppliers. Local travel guides whose subject matter is, for example, only a single city are practically never created.

A further deficit exists in the area of georeferencing. For example, it would be desirable if a destination, e.g. a parking garage, is made available in electronic form in an "approach description" that could be played back on the navigation device. It would thereby be possible to reach destinations that are not contained, or not correctly contained, in the map. For example, one could reach destinations located on streets for which no house number information is available, or entrances to buildings that are not recorded (parking garage entrances, hotel lobbies, etc.). Extensions for georeferencing based on the transmission of data do exist at present, but because of the varying map formats of different suppliers, they are difficult to implement.

SUMMARY OF THE INVENTION

The present invention provides a method and a device for operating a navigation system for a vehicle where additional information can easily be stored in the navigation system and can be retrieved as necessary by the driver and/or by other persons present in the vehicle and can be output via the navigation system.

According to one embodiment of the present invention, additional information relevant for navigation is loaded into the navigation device in the form of user programs, and is stored as so-called "navlets," making it possible to easily store additional information in the navigation system that can be retrieved as necessary by the driver and/or by other persons present in the vehicle, and can be output via the navigation system.

Since the navlets have access to the output units, the ability to modify the human-machine interface in the navigation system is possible according to one embodiment of the present invention. For example, it is possible to make available a navlet which permits input of the destination in a novel form. After the user has confirmed the destination, it is transmitted to the navigation system and the navlet terminates.

In another embodiment of the present invention, the navlets do not need to be associated with navigable map data and may contain additional information. For example, a hotel chain could make available a navlet that allows access to all the chain's hotels in Germany. Not only could this directory contain comprehensive information about location, category, and number of rooms, but views and short video clips could also make it easier to select a hotel. Once the driver decides on a hotel, however, only the address of that hotel is forwarded to the navigation system, and the navlet terminates.

Since the navlets are programs, it possible to exercise control over the navigation procedures using navlets in another embodiment of the present invention. For example, a navlet may contain a tourist guide for a city. When the navlet is started, it transfers the first place being visited to the navigation system, which then guides the user. The navlet is meanwhile capable of outputting information about the first destination via the screen or the audio channel. Once the first destination has been reached, the navlet can transfer the next destination to the navigation system. These operations can be continued indefinitely until the final trip destination has been reached.

In another embodiment of the present invention the navlets do not need to know the internal map format of the corresponding navigation device. It is entirely sufficient if data—in particular addresses (e.g., in city/street/number format) or coordinates (for example, in WGS 84 format)—are interchanged via a defined interface with the navigation device. Since the navlets are programs, it may be possible for the navlets to determine the type of navigation device and thereby effectively utilize device-specific and/or data-specific advantages of the particular navigation device.

The georeferencing of objects is simplified by the use of navlets according to another embodiment of the present invention. For example, a variety of conventional concepts allowing georeferencing to be described by means of data may be used. When a destination georeference of this kind is loaded into the navigation system according to the present invention, the navigation system is thus capable of calculating the appropriate route even if the destination is not itself contained in the map base. The present invention moreover makes even further capabilities available. For example, it is possible for navlets to guide actively to the destination. On the one hand, the capabilities of the navigation system can be used; on the other hand, navlets can contain their own driving instructions in the form of spoken texts, images, and videos. According to this embodiment, therefore, it is possible to provide individual destination guidance that is tailored to the needs of the particular customer.

In a further embodiment, the navlets may contain a mechanism for location-specific notification. Certain functions of the navlet can be called up by the navigation system when the vehicle is in the vicinity of a defined point or within a region (state, district, city, neighborhood, etc.), or when an address (instantaneous position, instantaneous destination) matches a given address. When a hotel is input via the navigation system, for example, it is possible for a corresponding navlet to start automatically and provide assistance. In another embodiment, a small icon (with distance indication) can appear automatically on the screen when the vehicle approaches a restaurant or fast-food outlet. In a further embodiment, a third-party supplier can offer a navlet that contains current detour recommendations for the entire country. As soon as the vehicle approaches a relevant city, the navlet is automatically started and outputs the respective recommendations.

According to one embodiment of the present invention, all the information relevant for navigation is loaded into the navigation device in the form of user programs. The user programs, as so-called navlets, have a function similar to the platform-independent applets used in conjunction with Internet browsers. An essential difference thus exists as compared to conventional navigation systems, in which information is loaded into the navigation device only in the form of data.

In another embodiment of the present invention, provision is made for the functions of the navigation section of a navigation system to be used by the navlets via interfaces of the navigation system.

A further embodiment of the present invention provides that the functions of the navigation section used by the navlets are, in particular, those such as:

querying and setting destinations and intermediate destinations by way of destination addresses or destination coordinates;

querying the present position as text or coordinates;

querying the current route list;

querying the estimated driving time to the next (interim) destination;

functions for setting parameters, for example the times for periodic calls or criteria for geometric notification;

querying the type of navigation system and the revision status of the firmware, the type and revision status of the database (map), etc.

Provision is further made, in another embodiment of the present invention, for specific functions to be executed by each navlet, of which one portion of the functions is directed toward the user's particular requirements and the other portion of the functions is defined as standard.

According to one embodiment of the present invention, the navigation system has a positioning system, an electronic data processing device that has access to a database having a digital road map, an input unit, and output units for visual and/or audio destination guidance instructions. The navigation system is made up of two main units, of which the first main unit is a navigation section having the components of a navigation device, the navigation device being functionally self-sufficient, and the second main unit is a device section for the execution of user programs, which is connected via interfaces to the navigation section, making it possible to provide a navigation system in which additional information can be stored in the navigation system and can be retrieved as necessary by the driver and/or by other persons present in the vehicle, and can be output via the navigation system.

DETAILED DESCRIPTION

Figure 1:
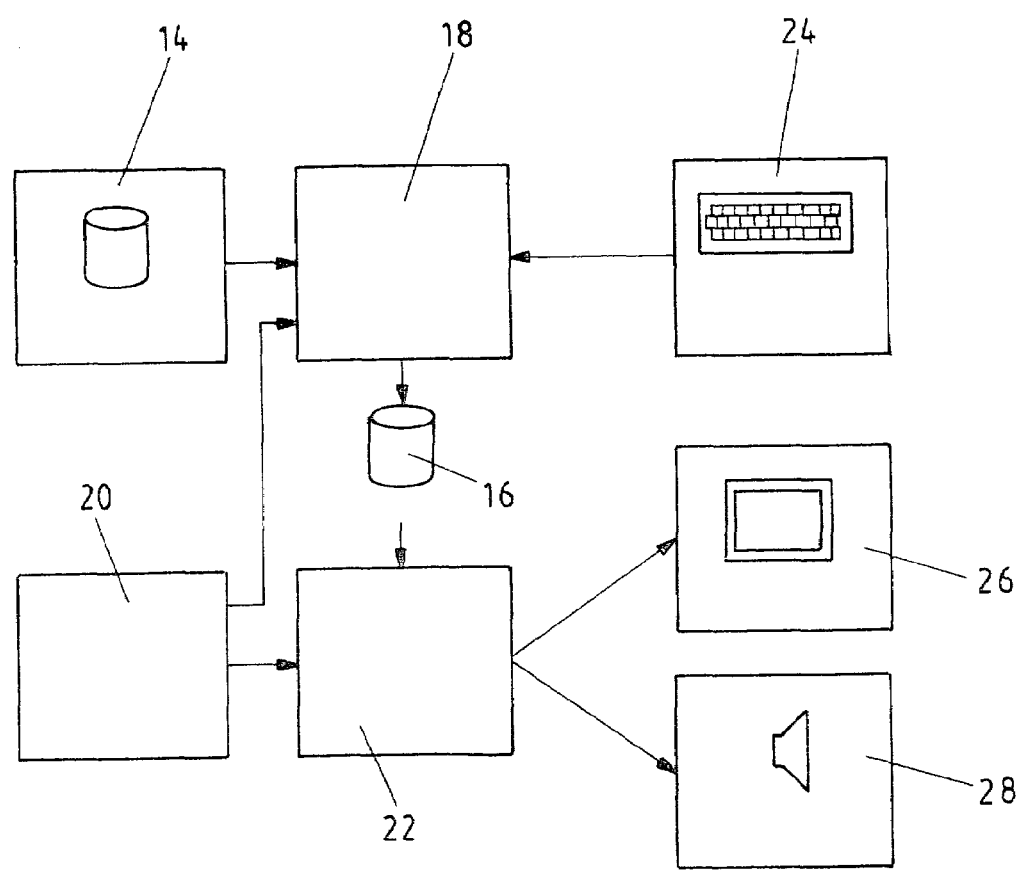
FIG. 1 is a schematic depiction of a conventional navigation system.

FIG. 1 is a schematic depiction of a conventional navigation system for a motor vehicle. The navigation system is made up of several individual components that are in functional connection with one another.

The navigation system consists of the following primary components: a database 14, route list 16, route calculation module 18, positioning system 20, and destination guidance unit 22.

The navigation system further encompasses an input unit 24 into which the driver enters his or her destination before beginning the trip; and, as output units, a visual output unit 26, for example a display, and an audio output unit 28, for example a loudspeaker.

Figure 2:
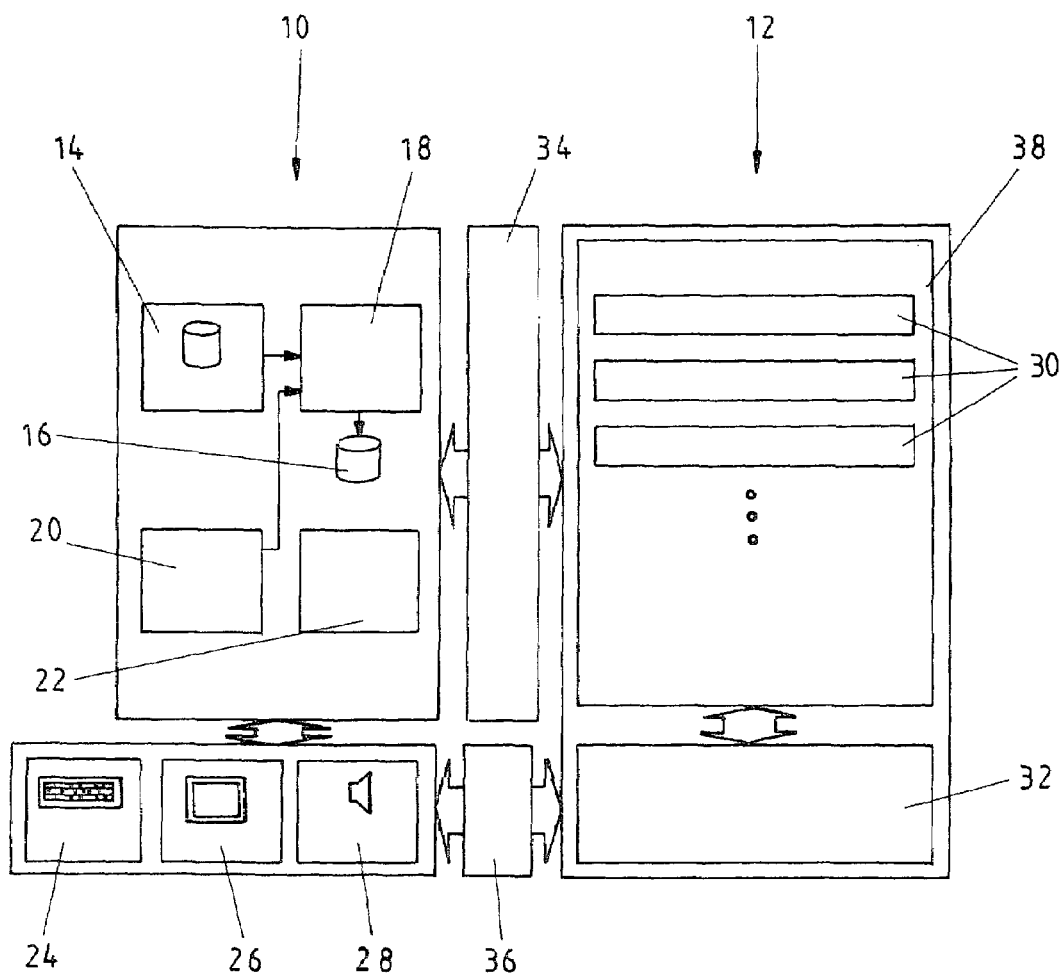
FIG. 2 is a schematic depiction of a navigation system according to one embodiment of the present invention.

A navigation system according to the one embodiment of the present invention is depicted schematically in FIG. 2. The navigation system is associated with a respective vehicle. It is made up of two main units 10, 12 that are connected via two interfaces 34, 36. The first main unit is a navigation section 10 having the components of a conventional navigation device, the navigation device being functionally self-sufficient. The second main unit is a device section 12 for the execution of user programs.

Navigation section 10 of the navigation system according to this embodiment of the present invention corresponds, in its general basic construction, to the conventional navigation system design depicted in FIG. 1. Navigation section 10 accordingly encompasses the following primary components: a database 14, a route list 16, a route calculation module 18, a positioning system 20, and a destination guidance unit 22. Also part of navigation section 10 are an input unit 24 for operation of the navigation system, a visual output unit 26 for the output of visual instructions and information, and an audio output unit 28 for the output of audio instructions and information.

According to this embodiment of the present invention, the device section 12 of the navigation system encompasses the following primary components: a user memory 38 and a virtual machine 32. Navlets 30 can be stored in user memory 38 in various quantities. Device section 12 of the navigation system is connected respectively via two interfaces 34, 36 to navigation section 10.

In contrast to operating system updates or firmware updates, navlets 30 are independent from the actual operating system of the navigation system. Instead, these are applications that are executed within an operating system or a virtual machine 32, and that have access to high-level functions of the navigation system. The use of navlets allows a large pool of potential providers the ability to provide data to a user through the navigation system by programming navlets 30 and making them available. The invention makes it possible to achieve, with navlets 30, additional benefits from navigation systems in vehicles similar to the benefit of applets within the Internet.

In further embodiments of the present invention, alternative and/or additional interfaces (not depicted) for data transfer, for example infrared and radio, can be activated and used by navlets 30.

In the navigation system, respectively, user memory 38 is connected via a first interface 34 to the navigation device 10, and via a second interface 36 to input unit 24 and to visual and audio output units 26, 28.

In one embodiment of the present invention, the navlets 30 are written in a platform-independent programming language, such as the "Java" programming language. As a result, navlets 30 can be used flexibly in navigation systems.

Each navlet 30 may be configured in such a way that it has internal data and functions. In addition to the internal data and functions, each navlet 30 may contain standard functions. The standard functions, according to one embodiment, may include functions such as:

an initialization function;
a delete function;
a start function;
a periodic call function;
a text notification function;
a geometric notification function; and
a further notification function.

In a further embodiment of the present invention, navlets 30 may be loadable into user memory 38 in different ways. A number of variant embodiments can be provided for this purpose.

One possible variant is that navlets 30 are loadable into user memory 38 by way of a memory medium, preferably RAM, flash ROM, mini hard drive, CD-ROM, or DVD.

Another variant may use navlets 30 loadable into user memory 38 by wire-conducted or wireless transfer, for example infrared or radio, from a PC, laptop, or PDA.

In a further variant, navlets 30 are loadable into user memory 38 by transfer from a server via broadcast, for example DAB, or individual communication, for example GSM.

The navigation system depicted schematically in FIG. 2 is operated in accordance with one embodiment of the method according to the present invention explained below.

The method according to one embodiment of the present invention provides for additional information relevant for navigation to be loaded into the navigation system in the form of user programs that, as navlets 30, are usable by the driver and/or by other persons present in the vehicle.

The navigation section 10 functions may be used by naviets 30 via interfaces 34, 36 of the navigation system. The navigation section 10 functions used by navlets 30 may, in particular, include:

querying and setting destinations and intermediate destinations by way of destination addresses or destination coordinates;
querying the present position as text or coordinates;
querying the current route list 16;
querying the estimated driving time to the next (interim) destination;
functions for setting parameters, for example the times for periodic calls or criteria for geometric notification;
querying the type of navigation section 10 and the revision status of the firmware, the type and revision status of the database (map), etc.

In one embodiment, each navlet 30 may execute predefined functions. One portion of the functions of navlet 30 may be directed toward the user's particular requirements, i.e. toward the requirements of the driver of the vehicle and optionally other vehicle occupants. Another portion of the functions of navlet 30 may include standard functions.

Each navlet 30 may include an initialization function that is called up when navlet 30 is installed for the first time on the navigation system. This function may be used to explain the manner of operation of navlet 30 to the user, or to inquire as to the user's preferences.

Each navlet 30 may further include a delete function which is called up when navlet 30 is removed.

A start function, which is called up once when the vehicle is started or when the navigation system is initiated, may be yet another function for each navlet 30 in another embodiment of the present invention.

Each navlet 30 furthermore may include a function for periodic calls, which are called up at regular time intervals and are used by navlet 30 to update internal data.

In a further embodiment, each navlet 30 may have a text notification function which is called up when a match or partial match exists between a given text and the instantaneous destination address, intermediate destination address, address of the instantaneous position, or an entry in route list 16; different notification functions can be defined for various criteria.

Each navlet 30 may include a geometric notification function which is called up when a predefined geometric criterion is met. Geometric criteria can be, for example, the distance to a given point or the location within a specific region (state, district, city, neighborhood).

Each navlet 30, in a further embodiment, may include further notification functions, such as arrival of a Traffic Message Channel (TMC) message or a message of another service, for example GSM.

The sale and transfer of navlets 30 may be effected via conventional media, for example CD-ROM and DVD, or via the Internet. It is also possible for companies to make navlets 30 available at no cost on their Internet home page, in order to facilitate access by their customers and/or to combine vehicle navigation with advertising.

What is claimed is:

1. A method for operating a navigation system for a vehicle, comprising:
   determining, using a positioning system, geographic position data of the vehicle;
   transmitting the geographic position data to an electronic data processing device having access to a database and a digital road map;
   determining a location of the vehicle on the digital road map in accordance with the geographic position data;
   outputting a destination guidance instruction to a driver of the vehicle at least one of visually and acoustically; and
   loading into the navigation system additional information relevant for a navigation as a program including a navlet, the navlet being usable by at least one of the driver and another person in the vehicle, wherein:
      at least one specific function is executed by the navlet, the at least one specific function is at least one of a function directed toward the user requirement and a function corresponding to a default setting, and
      the navlet includes a geometric notification function that is called up when a predefined geometric criterion is met.

2. The method according to claim 1, wherein the navlet accesses functions of a navigation section of the navigation system using an interface of the navigation system.

3. The method according to claim 1, wherein the navlet uses at least one of the following functions of a navigation section of the navigation system:
   a) querying and setting a destination and an intermediate destination using one of a destination address and destination coordinates;
   b) querying a present position as one of text and present position coordinates;
   c) querying a current route list;
   d) querying an estimated driving time to a next destination;
   e) setting a parameter of the navigation section, the parameter including one of times for periodic calls and criteria for geometric notification; and
   f) querying a type of the navigation section, a revision status of a firmware, a type of a database, and a revision status of the database.

4. The method according to claim 1, wherein the navlet includes an initialization function that is called up when the navlet is first installed on the navigation system.

5. The method according to claim 1, wherein the navlet includes a delete function that is called up when the navlet is removed.

6. The method according to claim 1, wherein the navlet includes a start function that is called up when one of the vehicle is started and the navigation is started.

7. The method according to claim 1, wherein the navlet includes a periodic call function that is called up at regular time intervals to update internal data.

8. The method according to claim 1, wherein the navlet includes a text notification function that is called up when one of a match and a partial match exists between a given text and one of an instantaneous destination address, an intermediate destination address, an address of an instantaneous position, and an entry in a route list, the text notification function being definable according to at least one of user-specified criteria and predetermined criteria.

9. The method according to claim 1, wherein the navlet includes at least one further notification function, including an arrival of one of a Traffic Message Channel and a GSM message.

10. The method according to claim 1, wherein the predefined geometric criterion includes one of a distance to a point and a location within a specific region.

11. A navigation system for a vehicle, comprising:
   a positioning system;
   a database including a digital road map;
   an electronic data processing device having access to the database;
   an input unit;
   an output unit outputting at least one of a visual destination guidance instruction and an audio destination guidance instruction;
   a navigation section including a navigation device that is functionally self-sufficient;
   a device section for executing a user program; and
   at least one interface connecting the device section and the navigation section wherein:
      the user program includes a navlet, and
      the navlet includes a text notification function that is called up when one of a match and a partial match exists between a given text and one of an instantaneous destination address, an intermediate destination address, an address of an instantaneous position, and an entry in a route list, the text notification function being definable according to at least one of user-specified criteria and predetermined criteria.

12. The system according to claim 11, wherein the navigation section includes the positioning system, the database, a route list, a route calculation module, a destination guidance unit, the input unit, the output unit.

13. The system according to claim 11, wherein the device section includes a user memory and a virtual machine.

14. The system according to claim 13, wherein the navlet is stored in the user memory.

15. The system according to claim 13, wherein the device section is connected to the navigation section using two of the at least one interface.

16. The system according to claim 15, wherein the user memory is connected to the navigation device of the navigation section by a first interface and the virtual machine is connected to the input unit and the output unit by a second interface.

17. The system according to claim 13, wherein the navlet is loaded into the user memory by using at least one of a RAM, a flash ROM, a mini hard drive, a CD-ROM, and a DVD.

18. The system according to claim 13, wherein the navlet is loaded into the user memory by one of a wire-conducted transfer and a wireless transfer from at least one of a PC, a laptop, and a PDA.

19. The system according to claim 18, wherein the wireless transfer is one of an infrared transfer and a radio transfer.

20. The system according to claim 13, wherein the navlet is loaded into the user memory from a server by one of a broadcast transfer and an individual communication transfer.

21. The system according to claim 11, wherein at least one additional interface is included for data transfer in the navigation system, the additional interface being used by the navlet.

22. The system according to claim 21, wherein the additional interface is one of an infrared interface and a radio interface.

23. The system according to claim 11, wherein the navlet is written in a platform-independent programming language.

24. The system according to claim 23, wherein the platform-independent programming language is the Java programming language.

25. The system according to claim 11, wherein the navlet includes internal data and at least one function, the function being at least one of a function directed toward a user's particular requirements and a standard function.

26. The system according to claim 25, wherein the standard function is at least one of:
   an initialization function;
   a delete function;
   a start function;
   a periodic call function;
   a text notification function;
   a geometric notification function; and
   a further notification function.

* * * * *